(12) United States Patent
Watford et al.

(10) Patent No.: US 10,427,258 B2
(45) Date of Patent: Oct. 1, 2019

(54) POSITIVE FEED TOOL WITH IMPROVED SHIFT FROM FORWARD TO RETRACT

(71) Applicant: Apex Brands, Inc., Apex, NC (US)

(72) Inventors: Jeremy Watford, Irmo, SC (US); Jason Allen Matthews, West Columbia, SC (US); Kevin Myhill, Lexington, SC (US); Marc Djabri, Le Raincy (FR)

(73) Assignee: APEX BRANDS, INC., Apex, NC (US)

( * ) Notice: Subject to any disclaimer, the term of this patent is extended or adjusted under 35 U.S.C. 154(b) by 2 days.

(21) Appl. No.: 15/505,050

(22) PCT Filed: Aug. 20, 2014

(86) PCT No.: PCT/US2014/051858
§ 371 (c)(1),
(2) Date: Feb. 17, 2017

(87) PCT Pub. No.: WO2016/028287
PCT Pub. Date: Feb. 25, 2016

(65) Prior Publication Data
US 2017/0274488 A1    Sep. 28, 2017

(51) Int. Cl.
*B23Q 5/32* (2006.01)
*B23Q 5/40* (2006.01)

(52) U.S. Cl.
CPC ............ *B23Q 5/326* (2013.01); *B23Q 5/402* (2013.01)

(58) Field of Classification Search
CPC . B23Q 5/326; B23Q 5/32; B23Q 5/22; B23Q 5/48; B23Q 5/402; B23Q 5/26; B23B 35/00; B23B 39/14
USPC ........ 173/146, 2, 19, 145, 20, 217; 408/137, 408/17, 124, 141, 138, 7, 130, 10; 251/65
See application file for complete search history.

(56) References Cited

U.S. PATENT DOCUMENTS 1,312,644 A    8/1919  Raab et al.
2,893,272 A    7/1959  Linsker
(Continued)

FOREIGN PATENT DOCUMENTS

CN    101058153 A    10/2007
CN    201519891 U     7/2010
(Continued)

OTHER PUBLICATIONS

International Search Report, International application No. PCT/US2014/051858. dated Apr. 21, 2015. European Patent Office. Rijswijk, NL.

*Primary Examiner* — Alexander M Valvis
*Assistant Examiner* — Mary C Hibbert-Copeland
(74) *Attorney, Agent, or Firm* — Coats & Bennett, PLLC

(57) ABSTRACT

Feed tools and methods of use for initiating a change in a spindle feed direction from an advance direction that moves the spindle towards a workpiece to a retract direction that moves the spindle away from the workpiece. The tool and methods may use a thrust overload force that is generated on one or more of the components to initiate the shift from forward to retract and/or a lift ring that acts on one or more of the components. The tool and methods may also include a two-stage piston to accomplish the shift. The various components may be used independently or in combination within the tool.

24 Claims, 13 Drawing Sheets

(56) References Cited

U.S. PATENT DOCUMENTS

| | | | |
|---|---|---|---|
| 3,411,385 A | 11/1968 | Quackenbush | |
| 3,577,807 A | 5/1971 | Alexander et al. | |
| 3,797,583 A | 3/1974 | Quackenbush | |
| 4,538,942 A | 9/1985 | Vindez | |
| 4,612,831 A | 9/1986 | Lehmkuhl | |
| 4,799,833 A * | 1/1989 | Pennison | B23Q 5/326 173/146 |
| 4,850,753 A | 7/1989 | Dudden | |
| 5,143,161 A | 9/1992 | Vindez | |
| 5,205,681 A | 4/1993 | Eckman | |
| 5,860,446 A | 1/1999 | Hunt | |
| 6,193,447 B1 | 2/2001 | Thames et al. | |
| 6,196,772 B1 | 3/2001 | Thames et al. | |
| 6,261,033 B1 * | 7/2001 | Thames | B23Q 5/326 408/1 R |
| 7,048,077 B2 | 5/2006 | Veres | |
| 7,145,834 B1 * | 12/2006 | Jeter | G01V 11/002 367/83 |
| 7,806,637 B2 | 10/2010 | Oehninger et al. | |
| 8,469,641 B2 | 6/2013 | Jaillon | |
| 8,522,941 B1 | 9/2013 | Eldessouky | |
| 9,120,160 B1 | 9/2015 | Eldessouky et al. | |
| 9,731,393 B2 | 8/2017 | Eriksson et al. | |
| 2008/0260485 A1 | 10/2008 | Jaillon et al. | |
| 2010/0215449 A1 * | 8/2010 | Kern | B23B 39/14 408/1 R |
| 2010/0300713 A1 | 12/2010 | Kume et al. | |
| 2011/0023667 A1 | 2/2011 | Kume et al. | |
| 2013/0168118 A1 | 7/2013 | Yamane | |
| 2014/0238711 A1 | 8/2014 | Myhill | |
| 2016/0001408 A1 | 1/2016 | Watford et al. | |
| 2016/0001435 A1 | 1/2016 | Watford et al. | |

FOREIGN PATENT DOCUMENTS

| | | |
|---|---|---|
| CN | 102320011 A | 1/2012 |
| CN | 103170686 A | 6/2013 |
| CN | 103906600 A | 7/2014 |
| DE | 60007004 T2 | 9/2004 |
| EP | 0060186 A2 | 9/1982 |
| EP | 0143158 A1 | 6/1985 |
| EP | 1618978 A1 | 1/2006 |
| EP | 1916045 A1 | 4/2008 |
| FR | 2881366 A1 | 8/2006 |
| GB | 2195164 A | 3/1988 |
| GB | 2419170 B | 12/2006 |
| WO | 0078501 A2 | 12/2000 |
| WO | 0078502 A2 | 12/2000 |
| WO | 0105559 A2 | 1/2001 |

\* cited by examiner

POSITIVE FEED TOOL WITH IMPROVED SHIFT FROM FORWARD TO RETRACT

BACKGROUND

Positive feed tools, such as but not limited to feed drills, are conventionally known for performing operations on workpieces formed of substances such as steel, aluminum, titanium, and composites. Positive feed tools include a tool feed mechanism that feeds a bit into a work piece. Conventional applications for positive feed tools include, among other applications, drilling holes in various parts of aircraft.

Positive feed tools generally include a motor configured to drive a spindle. The spindle may be rotated, and may advance a predetermined amount per revolution. The spindle is designed to move in an advance direction towards a workpiece, and a retract direction away from the workpiece.

Tools are designed to initiate a shift in the spindle from moving in the advance direction to moving in the retract direction. Typical methods for initiating the shift from advance to retract are mechanical cam levers or pneumatic pistons actuated by a pneumatic limit signal. Reliability of the operation of these mechanisms is vital for the operation of the tool. Failure of the mechanisms at this point may result in a disabled tool stuck with the spindle in the forward position. This can cause damage to the workpiece and/or the tool.

SUMMARY

The present application is directed to positive feed tools and methods configured to initiate a shift in the spindle from an advance direction to a retract direction.

One aspect of the present application is directed to tools and methods that involve a tool with both a poppet valve and a magnet arrangement to initiate the shift in spindle direction.

One embodiment is directed to a device that includes both a poppet valve and magnet arrangement. This feed tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. First and second gears are each operatively connected to the spindle. A differential drive including an elongated shaft is spaced laterally away from the spindle. The differential drive also includes a piston positioned on the shaft, and third and fourth gears positioned on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. The device also includes a magnet positioned on one of the piston and the closed end and a plate is positioned on the other of the piston and the closed end. The magnet and plate are magnetically attracted together to magnetically bias the piston towards the closed end of the chamber. A poppet valve that includes a head and a stem is positioned at the inlet to control fluid flowing through the inlet and into the chamber. The differential drive is movable relative to the chamber between first and second positions to selectively move the spindle between the first and second modes. The first position includes the piston in closer proximity to the closed end with the piston in contact with the head to position the head across the inlet. The second position includes the piston positioned a greater distance from the closed end with the head of the poppet valve spaced away from the inlet to allow fluid into the chamber.

The piston may be positioned at an end of the shaft and the chamber may be positioned at an end of the shaft.

The magnet may be mounted on the closed end of the chamber and include an opening that aligns with the inlet.

One of the magnet and the plate may form the closed end of the chamber.

A seal may extend around the inlet with the head of the poppet valve positioned against the seal when the differential drive is in the first position.

A first clutch may be mounted to the differential drive and second clutch positioned at the differential drive. The first and second clutches may include mating conical surfaces that engage together to prevent rotation of the fourth gear when the differential drive is in the second position.

The piston may be movable relative to the chamber with the piston being spaced away from the head of the poppet valve when the differential drive is in the second position.

The magnet may be mounted on the piston and the plate may be positioned on the closed end of the chamber.

One or more ramps may extend axially outward from each of the third and fourth gears with the ramps each including cam surfaces that contact together to drive the spindle in the first mode.

The shaft may extend through an opening in the third gear with the shaft and opening sized to allow the shaft to move independently of the third gear.

The shaft may be fixedly attached to the fourth gear.

A lift ring may axially extend from the second gear to contact against the fourth gear.

Another embodiment is directed to a tool that includes both a poppet valve and a magnet arrangement. This embodiment is a method of initiating a shift of a spindle between first and second directions along a feed path in a positive feed tool. The positive feed tool includes: a power source; gearing; a differential unit with a shaft, third and fourth gears, and a piston; a spindle unit with first and second gears each connected to the spindle; and a chamber positioned at an end of the differential unit. The method includes rotating the third gear thereby rotating the first gear that is driven by the third gear while rotating the second gear that is driven by the third gear through the fourth gear and driving the spindle in the first direction along the feed path. The method also includes magnetically attracting the piston towards a closed end of the chamber and contacting the piston against a poppet valve and closing the poppet valve and preventing fluid from entering into the chamber through the inlet. The method includes applying a force to the differential unit and moving the shaft, the fourth gear, and the piston away from the closed end of the chamber. The method also includes opening the poppet valve as the piston moves away from the closed end causing fluid to enter into the chamber through the inlet. The method includes moving the piston, the shaft, and the fourth gear farther away from the closed end of the chamber by the fluid entering into the chamber through the inlet. The method includes disengaging the fourth gear from the third gear through the movement and driving the spindle in the second direction along the feed path.

Rotating the third gear may include rotating the third gear through the power source and gearing.

Magnetically attracting the piston towards a closed end of the chamber includes attracting a magnet on the piston towards a plate in the chamber.

Magnetically attracting the piston towards a closed end of the chamber may include attracting a plate on the piston towards a magnet in the chamber.

Magnetically attracting the piston towards a closed end of the chamber may include contacting a magnet on one of the piston and the chamber against a plate on the other of the piston and the chamber.

The method may also include contacting a head of the poppet valve against the piston after fluid enters into the chamber through the inlet.

The method may include spacing the piston away from a head of the poppet valve when disengaging the fourth gear from the third gear.

The method may include increasing a fluid pressure within the chamber and moving the piston away from the closed end.

Applying the force to the differential unit may include contacting a lift ring against the fourth gear.

Applying the force to the differential unit may include sliding cam members on the third gear along cam members on the fourth gear and forcing the gears apart along the shaft.

The method may include sliding the shaft through an opening in the third gear and moving the shaft relative to the third gear while moving the piston, the shaft, and the fourth gear farther away from the closed end of the chamber.

The method may also include moving air through the inlet and into the chamber and creating a pressure in the chamber that overcomes the magnetic force between a magnet and a plate.

Another embodiment is directed to a tool that includes both a poppet valve and a magnet arrangement. The tool is configured to operate in a first mode and a second mode. The feed tool includes an elongated spindle adapted to carry a tool bit and to rotate and to move axially along a feed path with the spindle configured to operate in a first mode to move axially along the feed path in a first direction and a second mode to move axially along the feed path in an opposing second direction. First and second gears are each operatively connected to the spindle. A differential drive includes an elongated shaft spaced laterally away from the spindle, a piston positioned on the shaft, and third and fourth gears positioned on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. A magnet is positioned on one of the piston and the closed end and a plate is positioned on the other of the piston and the closed end. The magnet and plate are magnetically attracted together to magnetically bias the piston towards the closed end of the chamber. A poppet valve that includes a head and a stem is positioned at the inlet to control fluid flowing through the inlet and into the chamber. The differential drive is movable relative to the chamber between first and second positions to selectively move the spindle to the first and second modes. The first position includes the piston in closer proximity to the closed end with the piston in contact with the head to position the head across the inlet and prevent the fluid from entering into the chamber and for the third and fourth gears to be engaged together to drive the spindle in the first direction. The second position includes the piston positioned a greater distance from the closed end with the head of the poppet valve spaced away from the inlet to allow fluid into the chamber and with the third and fourth gears being disengaged to drive the spindle in the second direction. The spindle is configured to transition between the first mode to the second mode in response to the differential drive being moved between the first and second positions.

The present application includes another embodiment with both a poppet valve and a magnet arrangement. This embodiment is directed to a method of initiating a shift of a spindle between first and second directions along a feed path in a positive feed tool. The tool includes a power source, gearing, a differential unit with a shaft, third and fourth gears, and a piston, a spindle unit with first and second gears each connected to the spindle, and a chamber positioned at an end of the differential unit. The method includes driving the spindle in the first direction along the feed path while magnetically attracting the piston towards a closed end of the chamber and contacting the piston against a poppet valve and closing the poppet valve and preventing fluid from entering into the chamber through the inlet. The method includes applying a force to the fourth gear and moving the shaft, fourth gear, and the piston away from the closed end of the chamber with the shaft, fourth gear, and the piston being connected together. The method includes opening the poppet valve as the piston moves away from the closed end causing fluid to enter into the chamber through the inlet. The method includes moving the piston, the shaft, and the fourth gear farther away from the closed end of the chamber by the fluid entering into the chamber through the inlet. The method also includes disengaging the fourth gear from the third gear through the movement and driving the spindle in the second direction along the feed path.

Other embodiments are directed to a feed tool that includes just a magnet for transition of the spindle between forward and retract. One embodiment with just the magnet is directed to a feed tool configured to operate in a first mode and a second mode. The feed tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. First and second gears are each operatively connected to the spindle. A differential drive includes an elongated shaft spaced laterally away from the spindle, a piston mounted on the shaft, and third and fourth gears mounted on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. A magnet is positioned on one of the piston and the closed end and a plate is positioned on the other of the piston and the closed end. The magnet and plate are magnetically attracted together to magnetically bias the piston towards the closed end of the chamber. The differential drive is movable relative to the chamber between first and second positions to selectively move the spindle to the first and second modes. The first position includes the piston positioned to close the inlet and prevent the fluid from entering into the chamber. The second position includes the piston positioned away from to open the inlet to allow fluid into the chamber. The spindle is configured to transition between the first mode to the second mode in response to the differential drive being moved between the first and second positions.

The piston may be positioned at an end of the shaft and the chamber is positioned at an end of the shaft.

The magnet may be mounted on the closed end of the chamber and may include an opening that aligns with the inlet.

One of the magnet and the plate may form the closed end of the chamber.

The tool may also include a seal that extends around the inlet with a bottom side of the piston positioned against the seal when the differential drive is in the first position.

The tool may include a first clutch mounted to the shaft and a second clutch positioned at the differential drive with the first and second clutches including mating conical surfaces that engage together to prevent rotation of the fourth gear when the differential drive is in the second position.

The piston may be movable relative to the chamber with the piston being spaced away from the inlet when the differential drive is in the second position.

The magnet may be mounted on the piston and the plate may be positioned on the closed end of the chamber.

The tool may also include one or more ramps that extend axially outward from each of the third and fourth gears with the ramps each including cam surfaces that contact together to drive the spindle in the first mode.

The shaft may extend through an opening in the third gear with the shaft and opening sized to allow the shaft to move independently of the third gear.

The shaft may be fixedly attached to the fourth gear.

The tool may also include a lift ring that axially extends from the second gear to contact against the fourth gear.

Another embodiment that just includes the magnet is directed to a positive feed tool configured to operate in a first mode and a second mode. The tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. First and second gears are each operatively connected to the spindle. A differential drive includes an elongated shaft spaced laterally away from the spindle, a piston mounted on the shaft, and third and fourth gears mounted on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. A magnet is positioned on one of the piston and the closed end and a plate is positioned on the other of the piston and the closed end. The magnet and plate are magnetically attracted together to magnetically bias the piston towards the closed end of the chamber. The differential drive is movable relative to the chamber between first and second positions to selectively move the spindle to the first and second modes. The first position includes the piston extending across the inlet to close the inlet and for the third and fourth gears to be engaged together to drive the spindle in the first direction. The second position includes the piston spaced away from the inlet to allow fluid into the chamber and with the third and fourth gears being disengaged to drive the spindle in the second direction. The spindle is configured to transition between the first mode to the second mode in response to the differential drive being moved between the first and second positions.

Another embodiment is directed to a method of using a tool that includes just the magnet. The method includes initiating a shift of a spindle between first and second directions along a feed path. The positive feed tool includes a power source, gearing, a differential unit that includes a shaft with third and fourth gears and a piston at one end, and a spindle unit with first and second gears each connected to the spindle. A chamber is positioned at an end of the differential unit. The method includes rotating the third gear, and rotating the first gear that is driven by the third gear while rotating the fourth gear that is driven by the third gear through the fourth gear and driving the spindle in the first direction along the feed path. The method includes magnetically attracting the piston towards a closed end of the chamber and positioning the piston across the inlet and preventing fluid from entering into the chamber through the inlet. The method includes applying a force to the differential unit and moving the shaft, the fourth gear, and the piston as a unit away from the closed end of the chamber. The method includes moving fluid into the chamber through the inlet as the piston moves away from the closed end. The method includes moving the piston, the shaft, and the fourth gear farther away from the closed end of the chamber by the fluid entering into the chamber through the inlet. The method also includes disengaging the fourth gear from the third gear through the movement and driving the spindle in the second direction along the feed path.

Rotating the third gear may include rotating the third gear through the power source and gearing.

Magnetically attracting the piston towards a closed end of the chamber may include attracting a magnet on the piston towards a plate in the chamber.

Magnetically attracting the piston towards a closed end of the chamber may include attracting a plate on the piston towards a magnet in the chamber.

Magnetically attracting the piston towards a closed end of the chamber may include contacting a magnet on one of the piston and the chamber against a plate on the other of the piston and the chamber.

The method may also include increasing a fluid pressure within the chamber and moving the piston away from the closed end.

Applying the force to the differential unit may include contacting a lift ring that extends radially outward from the second gear against the fourth gear.

Applying the force to the differential unit may include sliding cam members on the third gear along cam members on the fourth gear and forcing the gears apart along the shaft.

The method may also include sliding the shaft through an opening in the third gear and moving the shaft relative to the third gear while moving the piston, the shaft, and the fourth gear farther away from the closed end of the chamber.

Another embodiment is directed to a tool with just a magnet. This embodiment is directed to a method of initiating a shift of a spindle between first and second directions along a feed path in a positive feed tool. The tool includes a power source, gearing, a differential unit that includes a shaft with third and fourth gears and a piston at one end, and a spindle unit with first and second gears each connected to the spindle, and a chamber positioned at an end of the differential unit. The method includes driving the spindle in the first direction along the feed path. The method includes magnetically attracting the piston towards a closed end of the chamber and positioning the piston over an inlet and preventing fluid from entering into the chamber through the inlet. The method includes applying a force to the differential unit and moving the shaft, fourth gear, and the piston as a unit away from the closed end of the chamber. The method includes opening the inlet as the piston moves away from the closed end causing fluid to enter into the chamber through the inlet. The method includes moving the piston, the shaft, and the fourth gear as a unit farther away from the closed end of the chamber by the fluid entering into the chamber through the inlet. The method also includes disengaging the fourth gear from the third gear through the movement and driving the spindle in the second direction along the feed path.

Another aspect of the invention is a positive feed tool and methods of use that include just a poppet valve to transition between the forward and retract positions. One embodiment is directed to a tool configured to operate in a first mode and a second mode. The tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. First and second gears are each operatively connected to the spindle. A differential drive includes an elongated shaft spaced laterally away from the spindle, a piston mounted on the shaft, and third and fourth gears mounted on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. A poppet valve that includes a head and a stem is positioned at the inlet to control fluid flowing through the inlet and into the chamber. The differential drive is movable relative to the chamber between first and second positions to selectively move the spindle from the first mode to the second mode. The first position includes the piston in closer proximity to the closed end with the piston in contact with the head to position the head across the inlet. The second position includes the piston positioned a greater distance from the closed end with the head of the poppet valve spaced away from the inlet to allow fluid into the chamber. The spindle is configured to transition between the first mode to the second mode in response to the differential drive being moved between the first and second positions.

The piston is positioned at an end of the shaft and the chamber is positioned at an end of the shaft.

The tool may also include a seal that extends around the inlet with the head of the poppet valve positioned against the seal when the differential drive is in the first position.

The tool may also include a first clutch mounted to the shaft and a second clutch positioned at the differential drive. The first and second clutches may include mating conical surfaces that engage together to prevent rotation of the fourth gear when the differential drive is in the second position.

The piston may be movable relative to the chamber with the piston being spaced away from the head of the poppet valve when the differential drive is in the second position.

The tool may also include one or more ramps that extend axially outward from each of the third and fourth gears with the ramps each including cam surfaces that contact together to drive the spindle in the first mode.

The shaft may extend through an opening in the third gear with the shaft and opening sized to allow the shaft to move independently of the third gear.

The shaft may be fixedly attached to the fourth gear.

The tool may also include a lift ring that axially extends from the second gear to contact against the fourth gear.

Another embodiment is directed to a tool and method that include just a poppet valve. This embodiment is directed to a method of initiating a shift of a spindle between first and second directions along a feed path in a positive feed tool. The tool includes a power source, gearing, a differential unit with a shaft with third and fourth gears and a piston at one end, and a spindle unit with first and second gears each connected to the spindle, and a chamber positioned at an end of the differential unit. The method includes rotating the third gear, and rotating the first gear that is driven by the third gear while rotating the fourth gear that is driven by the third gear through the fourth gear and driving the spindle in the first direction along the feed path. The method includes positioning the piston at a closed end of the chamber and contacting the piston against a poppet valve and closing the poppet valve and preventing fluid from entering into the chamber through the inlet. The method includes applying a force to the differential unit and moving the shaft, fourth gear, and the piston as a unit away from the closed end of the chamber. The method includes opening the poppet valve as the piston moves away from the closed end causing fluid to enter into the chamber through the inlet. The method includes moving the piston, the shaft, and the fourth gear as a unit farther away from the closed end of the chamber by the fluid entering into the chamber through the inlet. The method also includes disengaging the fourth gear from the third gear through the movement and driving the spindle in the second direction along the feed path.

Rotating the third gear may include rotating the third gear through the power source and gearing.

The method may also include contacting a head of the poppet valve against the piston after fluid enters into the chamber through the inlet.

The method may also include spacing the piston away from a head of the poppet valve when disengaging the fourth gear from the third gear.

The method may also include increasing a fluid pressure within the chamber and moving the piston away from the closed end.

Applying the force to the differential unit may include contacting a lift ring that extends radially outward from the second gear against the fourth gear.

Applying the force to the differential unit may include sliding cam members on the third gear along cam members on the fourth gear and forcing the gears apart along the shaft.

The method may also include sliding the shaft through an opening in the third gear and moving the shaft relative to the third gear while moving the piston, the shaft, and the fourth gear together farther away from the closed end of the chamber.

Another embodiment having just a poppet valve is directed to a positive feed tool configured to operate in a first mode and a second mode. The feed tool includes an elongated spindle adapted to carry a tool bit and to rotate and to move axially along a feed path. The spindle is configured to operate in a first mode to move axially along the feed path in a first direction and a second mode to move axially along the feed path in an opposing second direction. First and second gears are each operatively connected to the spindle.

A differential drive includes an elongated shaft spaced laterally away from the spindle, a piston mounted on the shaft, and third and fourth gears mounted on the shaft. A drive train is engaged with the third gear to drive the differential drive. The third gear and the first gear are engaged to rotate the spindle, and the fourth gear and the second gear are engaged to axially move the spindle. A chamber is positioned at the differential drive and includes sidewalls, a closed end, and an opposing open end. The chamber is positioned with the shaft extending into the open end and the piston positioned within the chamber. An inlet extends through the closed end of the chamber. A poppet valve includes a head and a stem and is positioned at the inlet to control fluid flowing through the inlet and into the chamber. The differential drive is movable relative to the chamber between first and second positions to selectively move the spindle to the first and second modes. The first position includes the piston in closer proximity to the closed end with the piston in contact with the head to position the head across the inlet and for the third and fourth gears to be engaged together to drive the spindle in the first direction. The second position includes the piston positioned a greater distance from the closed end with the head of the poppet valve spaced away from the inlet to allow fluid into the chamber and with the third and fourth gears being disengaged to drive the spindle in the second direction. The spindle is configured to transition between the first mode to the second mode in response to the differential drive being moved between the first and second positions.

Another embodiment with just the poppet valve is directed to a method of initiating a shift of a spindle between first and second directions along a feed path in a positive feed tool. The positive feed tool includes a power source, gearing, a differential unit that includes a shaft with third and fourth gears and a piston at one end, and a spindle unit with first and second gears each connected to the spindle, and a chamber positioned at an end of the differential unit. The method includes driving the spindle in the first direction along the feed path. The method includes positioning the piston at a closed end of the chamber and contacting the piston against a poppet valve and closing the poppet valve and preventing fluid from entering into the chamber through the inlet. The method includes applying a force to the fourth gear and moving the shaft, fourth gear, and piston as a unit away from the closed end of the chamber. The method includes opening the poppet valve as the piston moves away from the closed end causing fluid to enter into the chamber through the inlet. The method includes moving the piston, the shaft, and the fourth gear together farther away from the closed end of the chamber by the fluid entering into the chamber through the inlet. The method also includes disengaging the fourth gear from the third gear through the movement and driving the spindle in the second direction along the feed path.

The various aspects of the various embodiments may be used alone or in any combination, as is desired.

DETAILED DESCRIPTION

The present application is directed to devices and methods of initiating a change in a positive feed tool from a first direction to a second direction. In one embodiment, this includes the change from a forward direction to a reverse direction. The devices and methods include one or more of a magnet arrangement and a poppet valve.

Figure 1:
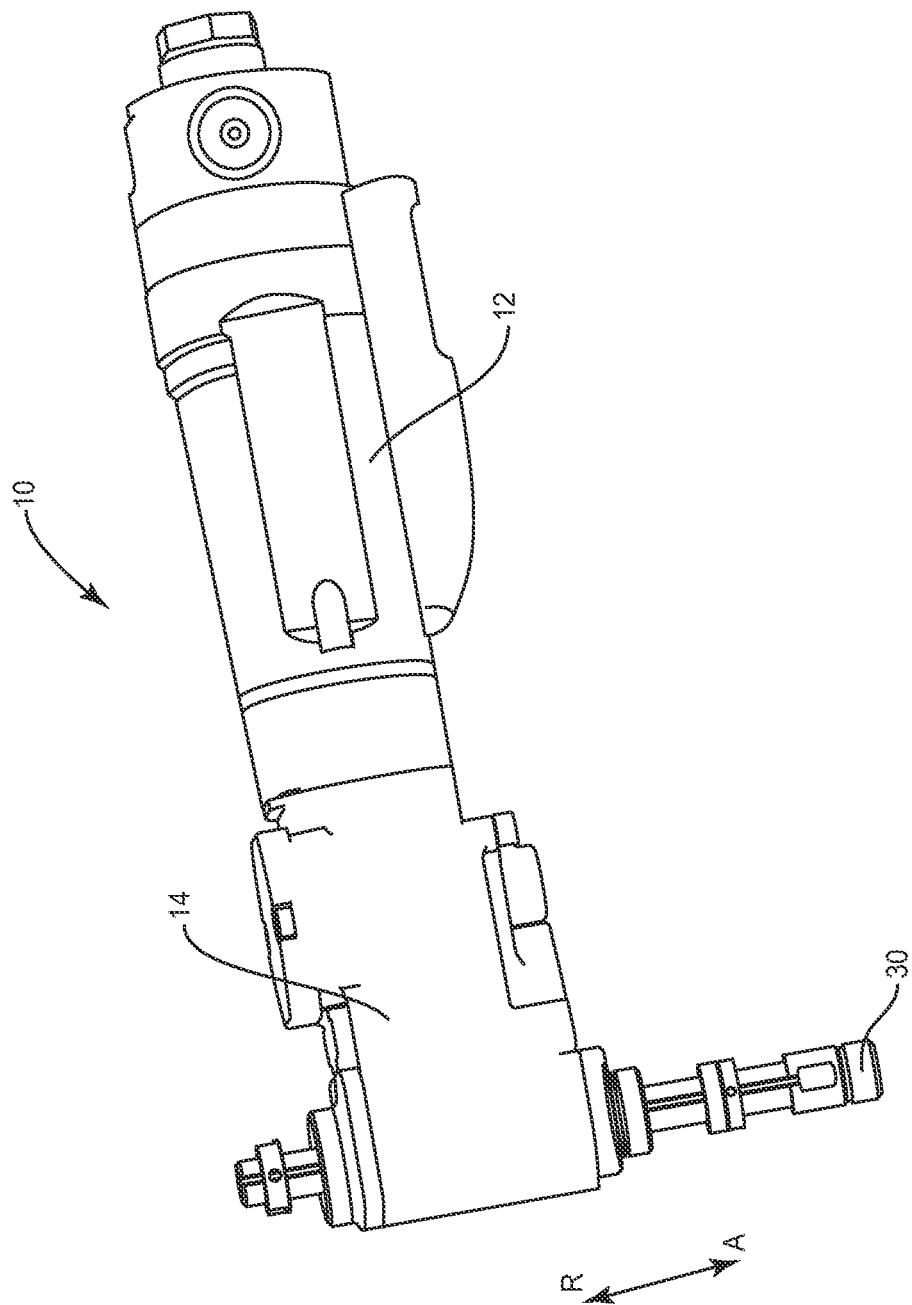
FIG. 1 is a perspective view of a right-angle tool.
Figure 2:
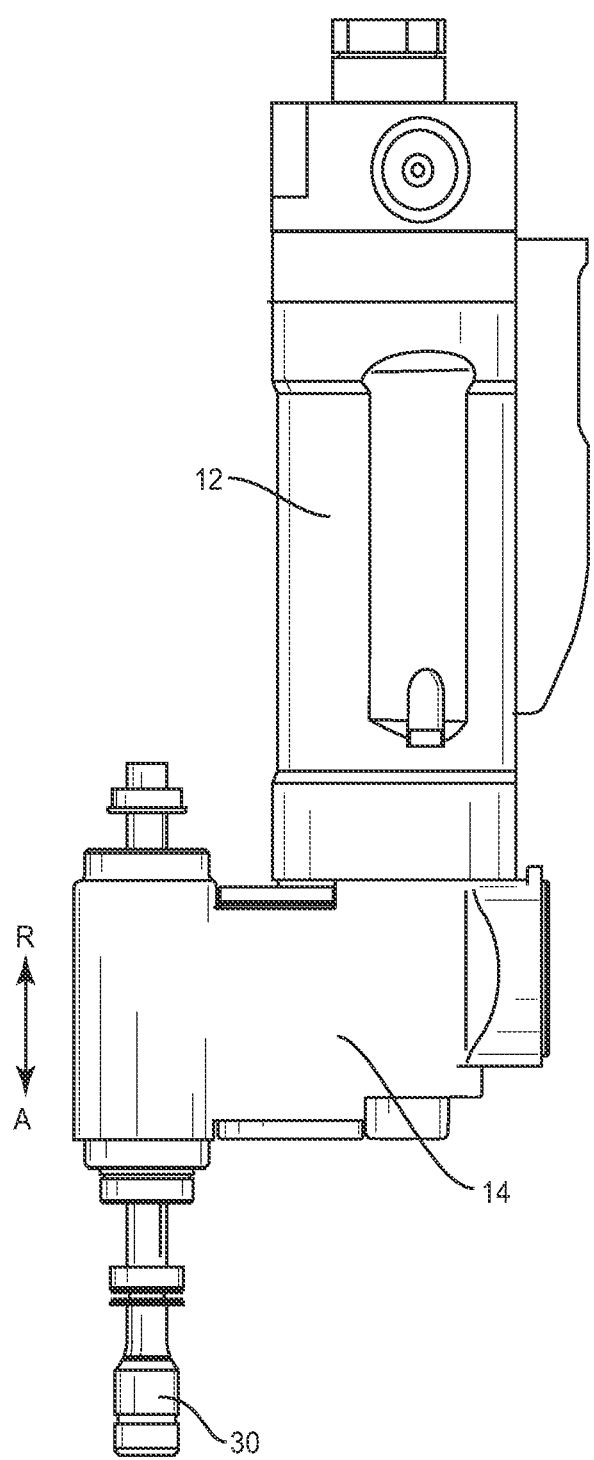
FIG. 2 is a perspective view of an in-line tool.

The tool 10 generally includes a motor 12 and a gear head 14 that includes the spindle 30. FIG. 1 illustrates an example of a positive feed tool, specifically a right-angle positive feed tool 10. FIG. 2 shows a positive feed tool 10 with an inline configuration. Right angle and inline refer to the position of a motor 12 relative to an axis of a spindle 30. The positive feed tool 10 generally includes a spindle 30 that, in addition to rotating, advances a predetermined amount per revolution toward the workpiece to be drilled. The spindle 30 is designed to move in the advance direction A towards a workpiece and in a retract (i.e., reverse) direction R away from the workpiece. The motor 12 may be powered by a pressurized air source, hydraulic/fluid operation (not illustrated), or electric power source (not illustrated).

Figure 3A:
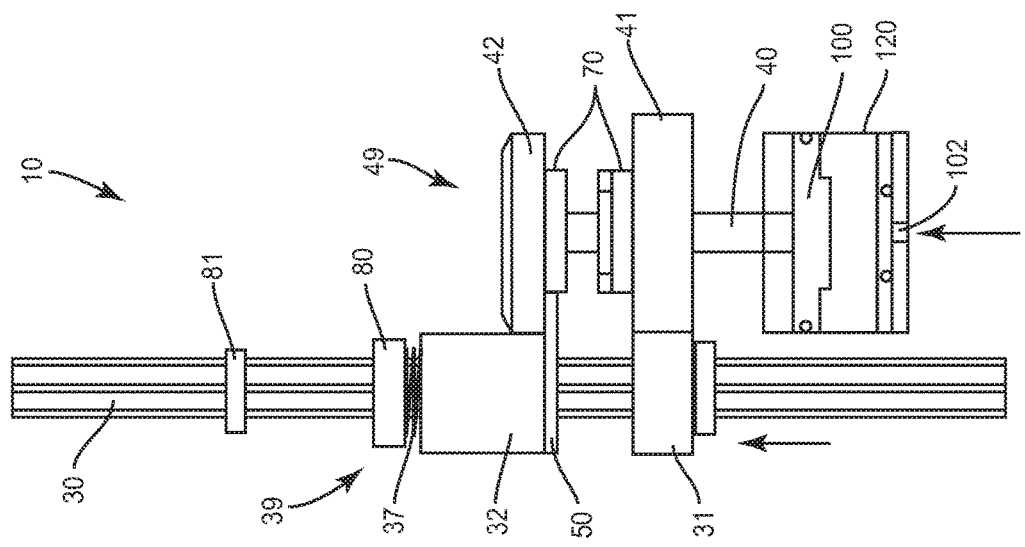
FIG. 3A is a side schematic side view of components of a tool operating in an advance direction.
Figure 3B:
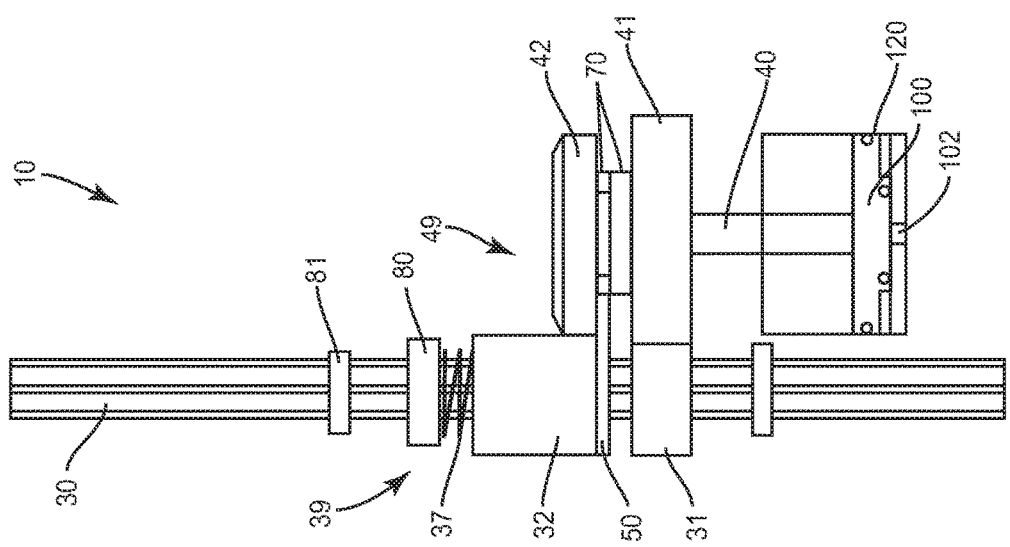
FIG. 3B is a side schematic side view of components of a tool operating in a retract direction.

FIGS. 3A and 3B provide an overview of the aspects of the tool 10 that moves the spindle 30 in the advance direction (FIG. 3A) and the retract direction (FIG. 3B). The tool 10 generally includes a spindle unit 39 and a differential unit 49. The units 39, 49 are generally aligned parallel to one another within the interior of a gear head 14. The spindle unit 39 includes one or more of the spindle 30, spindle drive gear 31, spindle feed gear 32, and a lift ring 50. The differential unit 49 includes one or more of the differential drive gear 41, differential feed gear 42, piston 100, and a feed shaft 40.

The spindle 30 is an elongated member that includes one or more slots for engagement with the drive gear 31 and threads for engagement with the feed gear 32. The drive gear 31 and feed gear 32 each include an annular shape with a central opening to receive the spindle 30. The drive gear 31 includes one or more tangs that engage in the one or more slots in the spindle 30, and the feed gear 32 includes threads to engage with the threads along the spindle 30. Teeth extend around the outer periphery of each gear 31, 32 to engage with corresponding gears in the differential unit 49.

The spindle 30 may extend through a support 80, which may include a housing that extends around the gear head 14. The support 80 remains stationary during rotation and axial movement of the spindle 30. A depth stop member 81 may be attached to the spindle 30 to control an extent of axial movement of the spindle 30 in the advance direction. The depth stop 81 is attached to the spindle 30 and moves axially with the spindle 30. In one or more embodiments, the depth stop 81 is a collar that is threaded onto the spindle 30. The depth stop 81 extends radially outward from the spindle 30 and is sized to contact against the support 80 to prevent additional axial movement of the spindle 30 in the advance direction. To prevent damage, the support 80 may include a bearing at the point at which the spindle 30 can no longer be driven forward. A biasing device 37 is positioned between the spindle feed gear 32 and the support 80.

In the differential unit 49, each of the drive gear 41 and feed gear 42 extend around the feed shaft 40 and include teeth around their periphery to engage with the corresponding gears 31, 32 of the spindle unit 39. The piston 100 is positioned in a chamber 120 below the gears 41, 42. The feed shaft 40 is attached to the piston 100 and differential feed gear 42 to axially move as a unit. The differential drive gear 41 extends around the feed shaft 40 but does not axially move with the feed shaft 40. Air is directed through one or more inlets 102 at a bottom of the chamber 120.

The gears 31, 32, 41, 42 of the spindle unit 39 and the differential unit 49 are configured to provide rotation and feed (advance and retract) to the spindle 30. The differential drive gear 41 is driven through the motor 12. Differential drive gear 41 engages with spindle drive gear 31 which is operatively connected to the spindle 30 to thereby provide rotation to the spindle 30. The differential drive gear 41 is also operatively connected to and rotates the differential feed gear 42. The differential feed gear 42 engages with the spindle feed gear 32 which is threaded onto the spindle 30. The feed gears 32, 42 provide for the spindle 30 to move in the advance and retract directions with the rate and direction of feed based on ratios between the drive gear 41/drive gear 31 and the feed gear 42/feed gear 32. In one or more embodiments, the thread on the spindle 30 is made left hand such that feed in the advance direction is achieved by rotating the spindle feed gear 32 faster than the spindle drive gear 31. In another embodiment, the spindle 30 is made right-handed such that the feed in the advance direction is achieved by rotating the spindle feed gear 32 slower than the spindle drive gear 31.

To move the spindle 30 in the retract direction, the differential feed gear 42 is disengaged from the differential drive gear 41 and held stationary. This causes the spindle feed gear 32 to also become stationary. The spindle 30 retracts as it is still being rotated by the drive gear 31.

Figure 4:
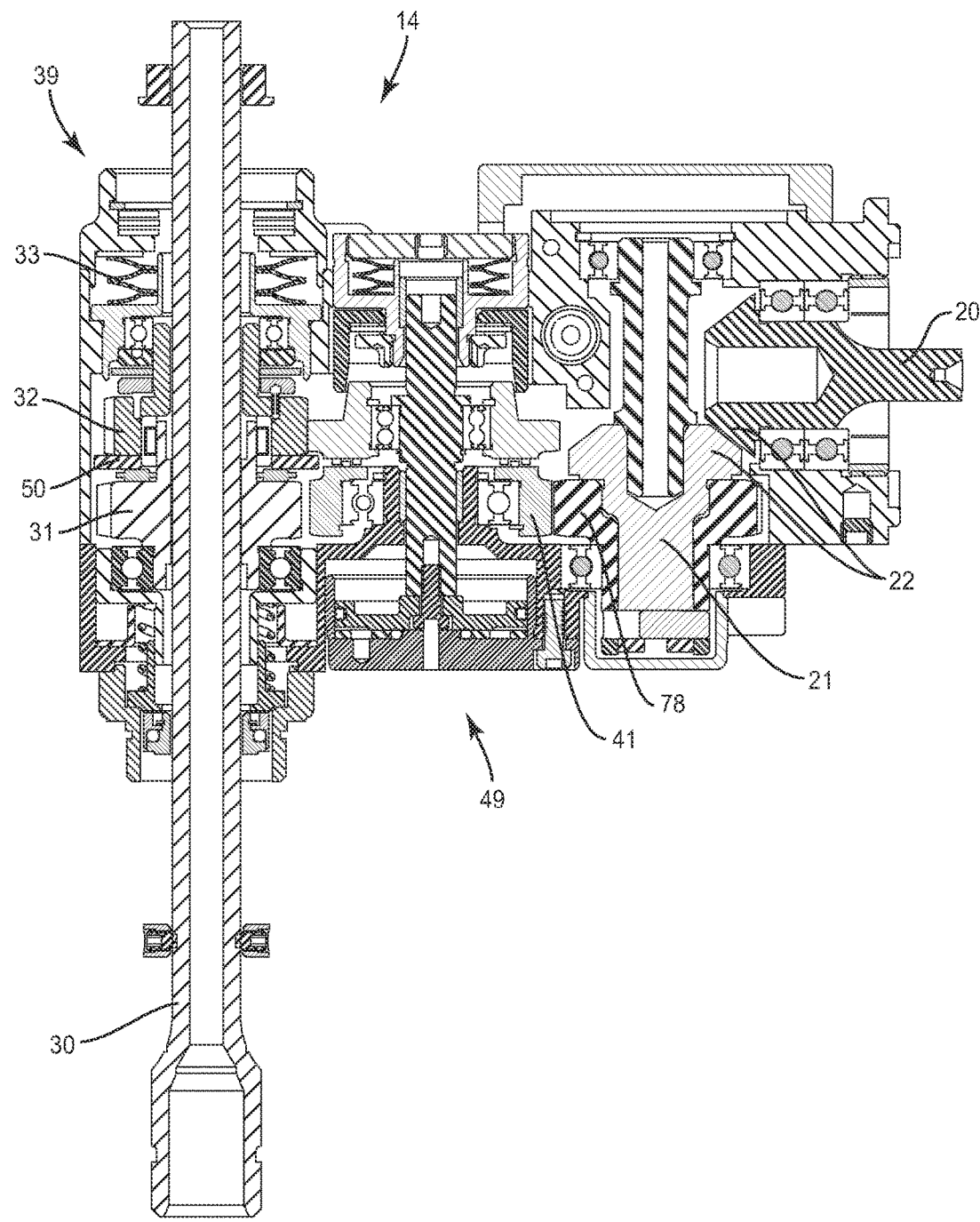
FIG. 4 is a side sectional view of a gear head.

The spindle unit 39 and the differential unit 49 form the gear head 14 configured to be attached to the motor 12. FIG. 4 illustrates a side schematic view of a right angle feed gear head 14 separated from the motor 12. The tool 10 includes an input shaft 20 that is driven by the motor 12 (not illustrated in FIG. 4). For the right-angle version, a set of bevel gears 22 is employed to provide rotation to an input gear 78 attached to a shaft of the driven bevel gear 22 to engage with and provide a driving force to the differential drive gear 41. Thus, the input gear 78 is configured to provide a force to rotate the differential drive gear 41 (and thus the operatively connected differential feed gear 42, spindle drive gear 31, and spindle feed gear 32). A similar configuration is used for an inline tool with the input gear 78 being driven by the motor 12 either directly or through reduction gear boxes commonly called planetary gear boxes. For both a right angle gear head 14 and inline gear head 14, the spindle unit 39 and differential unit 49 are substantially the same.

In one or more embodiments, the positive feed tool 10 uses a pressurized air supply for the motor power. This same air supply is then used to control certain other functions within the overall tool operation. In one or more embodiments that include an electric motor 12, a separate pressurized air supply provides these control functions or a similar electric actuation control is used. In one or more embodiments, the piston 100 and the chamber 120 are supplied with air from the pressurized air supply. Supply of the air is controlled by the air logic system within the tool 10.

Figure 5:
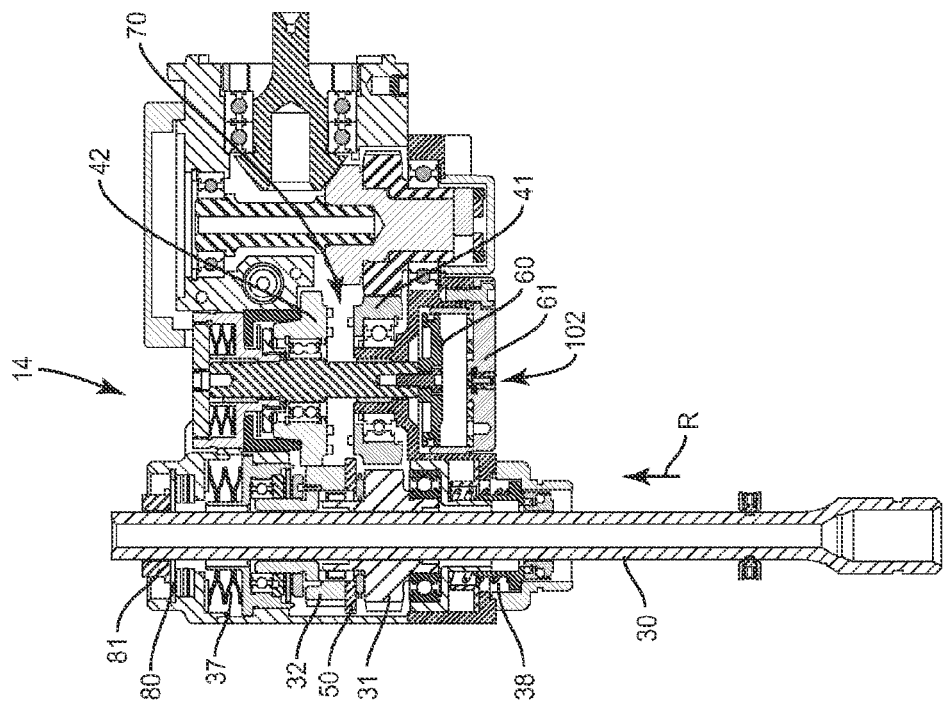
FIG. 5 is a side sectional view of a gear head in a forward feed operation.
Figure 6:
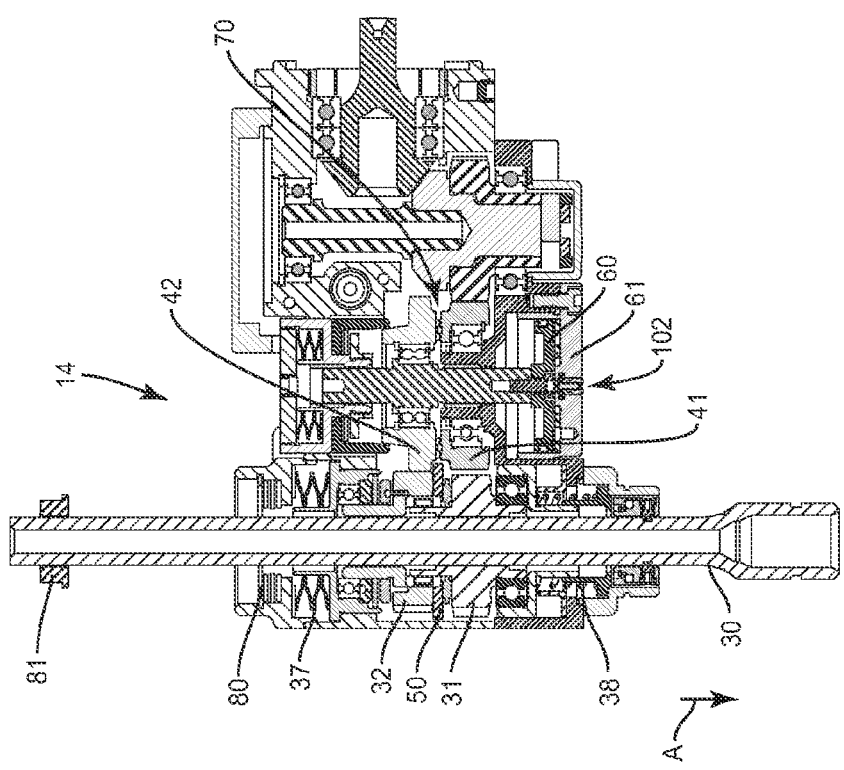
FIG. 6 is a side sectional view of a gear head in a retract operation.

FIGS. 5 and 6 illustrate that the spindle 30 is caused to rotate and axially move by rotating the spindle drive gear 31 and the spindle feed gear 32 respectively with the differential drive gear 41 and the differential feed gear 42. The spindle feed gear 32 includes internal threads that are threaded onto the spindle's external threads. Hence, when the spindle feed gear 32 is rotated in relation to the spindle 30, the spindle 30 will feed in the advance direction through the spindle feed gear 32. In one or more embodiments, external threads of the spindle 30 are left-handed threads. The spindle 30 also includes slots that extend along its length. The spindle drive gear 31 includes internal male splines that engage with the drive grooves on the spindle 30. Thus, when the spindle drive gear 31 is rotated, the spindle 30 also rotates.

FIG. 5 illustrates the gear head 14 operating to move the spindle 30 in the advance direction indicated by arrow A. As illustrated, the differential feed gear 42 is engaged with and rotated by the differential drive gear 41. The differential feed gear 42 in turn rotates the spindle feed gear 32 that is engaged with the spindle 30. The rotation of the spindle feed gear 32 about the spindle 30 axially drives the spindle 30 in the advance direction A. The extent of movement of the spindle 30 may be set by the depth stop 81 that contacts against the support 80 at the maximum depth.

The tool 10 is configured to change the feed direction to retract the spindle 30 after this desired amount of axial movement of the spindle 30 in the advance direction A. To change the gear head 14 to retract, the differential feed gear 42 is disengaged from the differential drive gear 41. The disengagement results in the differential feed gear 42 being held stationary. Because the spindle feed gear 32 is driven through the differential feed gear 42, the spindle feed gear 32 also becomes stationary. With the spindle 30 still being driven by the spindle drive gear 31 (through the differential drive gear 41), the spindle 30 is caused to retract due to the threads along the length of the spindle 30 that are engaged in the spindle feed gear 32.

The feed tool 10 may include one or more aspects to improve the operational reliability of shifting from feed to retract. The tool 10 includes a two stage piston 100, and one or more of a torque overload clutch 70 formed between the differential feed gear 42 and the differential drive gear 41, and a mechanical lift ring 50 that axially moves the differential feed gear 42. In one or more embodiments, the tool 10 includes each of these aspects. Other embodiments include the feed tool 10 having just a single one of these aspects. Still other embodiments may include the feed tool 10 having two or more of these aspects. In one specific embodiment, the tool 10 includes a lift ring 50 and a two-stage piston 100. In another specific embodiment, the tool 10 includes the torque overload clutch 70 and the two-stage piston 100. FIGS. 5 and 6 include an embodiment that includes a clutch 70, lift ring 50, and a two-stage piston 100.

The torque overload clutch 70 is one manner to shift the tool 10 between forward and retract operations. The clutch 70 includes matching ramps 85 on the contact faces of the differential drive gear 41 and differential feed gear 42. The ramps 85 mate together for the drive gear 41 to rotate the feed gear 42.

Figure 7:
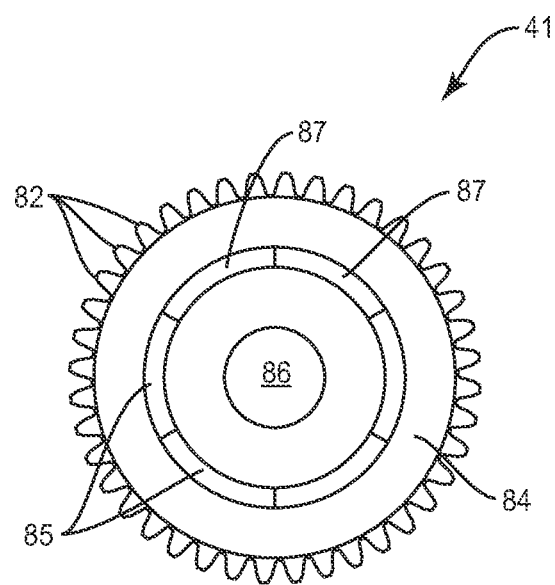
FIG. 7 is a top view of a differential drive gear with ramps that form a portion of a threshold clutch.
Figure 7A:
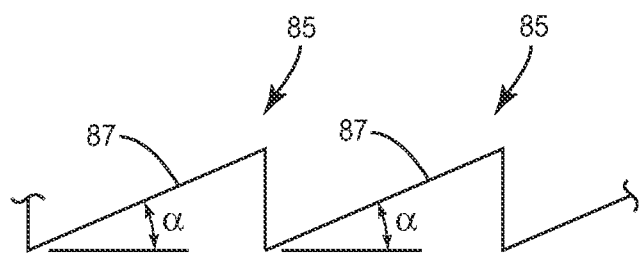
FIG. 7A is a side view of two of the ramps of FIG. 7.

FIG. 7 illustrates a top view of the differential drive gear 41 that includes a circular shape. A central opening 86 is sized to receive the feed shaft 40. The axial face 84 that faces towards the feed gear 42 includes ramps 85 that each includes a sloped cam face 87 as best illustrated in FIG. 7A. The cam faces 87 are aligned at an angle α with the face 84. The angle α may vary depending upon the extent of necessary engagement. In one or more embodiments as illustrated in FIG. 7, the ramps 85 extend completely around the central opening 86. Other embodiments may include different numbers and configurations of ramps 85. The differential feed gear 42 includes a similar configuration with corresponding ramps 85 that mate together. The ramps 85 on the opposing gears 42, 41 may include the same or different angles α.

Figure 8:
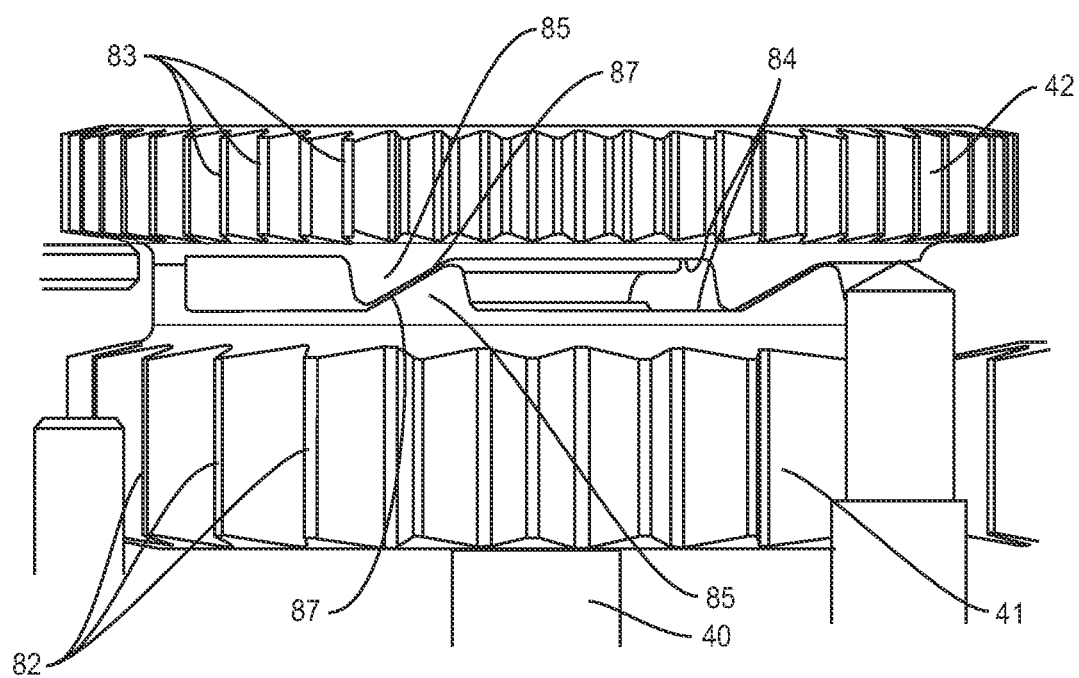
FIG. 8 is a side perspective view of a threshold clutch formed between a differential drive gear and a differential feed gear.

FIG. 8 illustrates the differential drive gear 41 and differential feed gear 42 mated together, such as when the tool 10 is operating in the advance direction. The cam faces 87 of the opposing ramps 85 contact together for the drive gear 41 to rotate the feed gear 42. The drive gear 41 also includes the gear teeth 82 along the periphery that engage with corresponding teeth on the spindle drive gear 31. Likewise, the feed gear 42 includes peripheral teeth 83 that engage with teeth on the spindle feed gear 32. In the event that the differential feed gear 42 cannot be driven, then the two gears 41, 42 will separate along the axis of the differential feed shaft 40. The amount of torque for overload to cause the separation is a function of the force applied between a magnet 103 and plate 104 on the differential unit 49 and chamber 120. This force maintains the gears 41, 42 together. Once this force is overcome, the gears will move apart against the magnetic force between the magnet 103 and plate 104. In one embodiment, the magnetic force between the magnet 103 and plate 104 is about 25 pounds when the magnet 103 is in contact with the plate 104, and about 5 pounds when the piston 104 and plate 104 are spaced apart.

When the tool 10 is operating in the advance direction as illustrated in FIG. 5, the differential feed gear 42 is coupled to the differential drive gear 41 through the clutch 70 that includes the contacting ramps 85 that are held in contact by the magnetic force explained above. The spindle feed gear 32 rotates at a differential speed relative to the spindle drive gear 31 hence causing the spindle 30 to advance. At the extent of movement of the spindle 30 in the advance direction, additional movement of the spindle 30 is stopped through the depth stop member 81 contacting against the support 80. At the contact between the depth stop 81 and the support 80, the drive to the spindle feed gear 32 is still occurring from the differential feed gear 42 (through the differential drive gear 41). As the spindle 30 is prevented from moving forward, the spindle feed gear 32 that is threaded onto the spindle 30 moves axially backwards against the biasing member 37. This structure is developed for "thrust overload" and is of particular advantage for tools that are used for countersinking where a small dwell period at the end of the spindle stroke is greatly advantageous for accurate countersink depth and maintaining a clean finish on the countersink form.

In one or more embodiments, the biasing member 37 on the spindle unit 39 includes one or more Belleville washers. In other embodiments they could be of a wave type or conventional compression springs. The member 37 has a preload approximately equal to the thrust rating of the gear head 14. It has been determined that wave washers may have drawbacks in that due to their ID/OD size they must be placed on top of the spindle feed gear 32. In one or more embodiments, the biasing member 37 includes one or more wave springs as they have a smaller OD for the same given ID and can hence be placed in parallel with the spindle feed gear 32. This keeps the overall height of the gear head 14 lower which is advantageous as it allows the tool 10 to reach into more confined spaces.

The backward movement of the spindle feed gear 32 along the spindle 30 causes the gear 32 to move against the biasing member 37. This results in additional torque being needed through the differential feed gear 42 to rotate the spindle feed gear 32. This additional torque in return requires additional torque to be supplied by the differential drive gear 41. The additional torque required between the differential drive and feed gears 41, 42 causes the cam faces 87 to slide against each other and for the gears 41,42 to axially separate.

Figure 9:
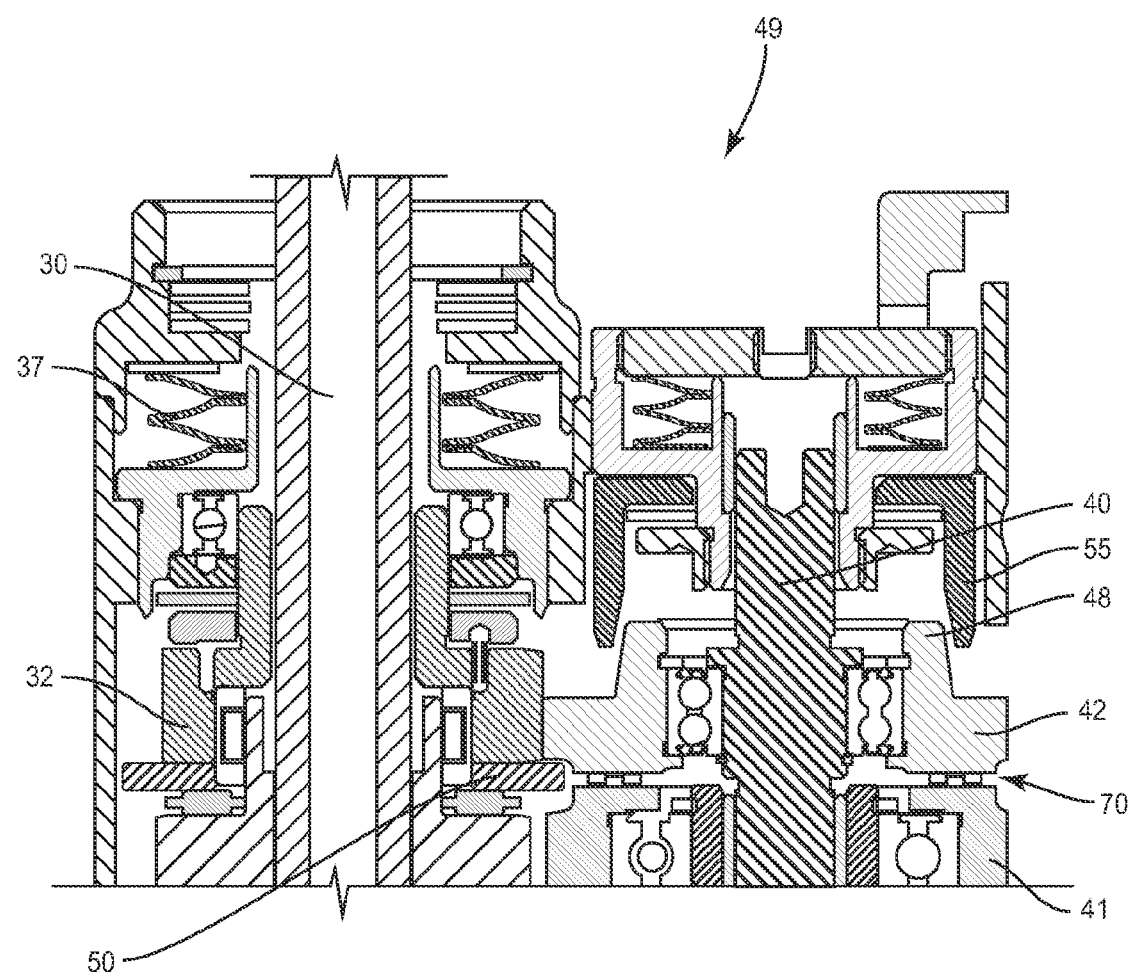
FIG. 9 is a side schematic view of a spindle feed gear with a lift ring and a holding mechanism to prevent rotation of a differential feed gear.

In one or more embodiments, a holding mechanism is included along the differential unit 49 to prevent rotation of the differential feed gear 42 when the tool 10 is operating in the retract direction. In one embodiment as illustrated in FIG. 9, the holding mechanism includes a cone clutch. The top of the differential feed gear 42 includes a male cone 48 with a tapered width. Further, a female cone 55 is positioned adjacent to the differential feed gear 42 and extends around the feed shaft 40. In one or more embodiments, the female cone 55 is held stationary during engagement with the differential feed gear 42. The cone angle between the cones 48, 55 is designed to create a holding force to prevent rotation of the differential feed gear 42 but still allow axial movement of the differential feed gear 42 (i.e., the angle should not create a taper lock). When the tool 10 is in retract, the differential feed gear 42 is forced upward through the sliding cam faces 87 of the clutch mechanism 70. This upward movement forces the male cone 48 into the female cone 55 thus preventing rotation. FIG. 9 includes an embodiment with the differential feed gear 42 including the male cone 48. Other embodiments may reverse the male and female cones 48, 55.

Figure 10:
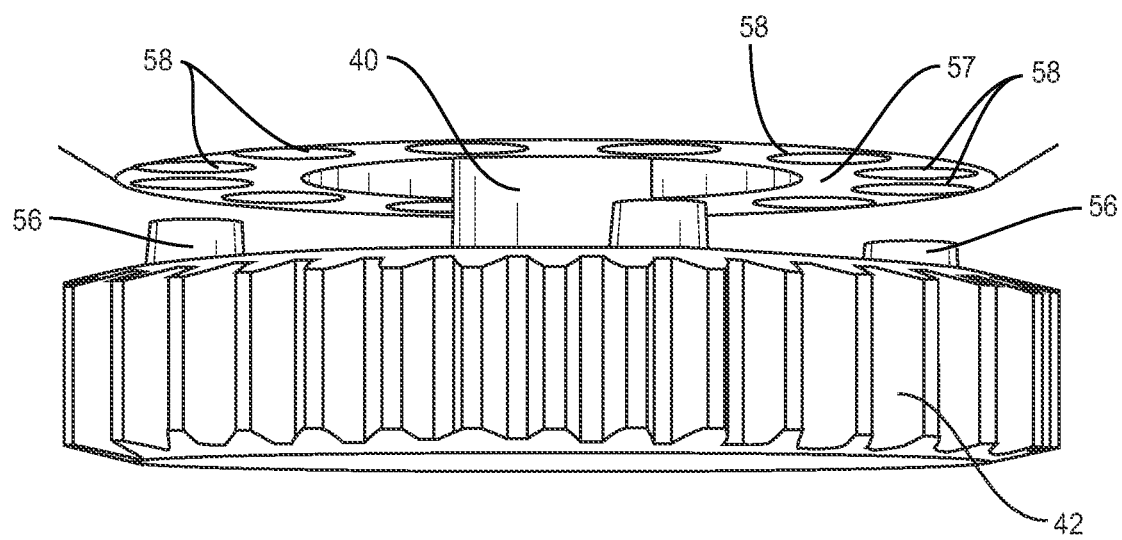
FIG. 10 is a side perspective view of a holding mechanism to prevent rotation of a differential feed gear.

The holding mechanism may also include dog clutch as illustrated in FIG. 10. The differential feed gear 42 includes one or more pins 56 that extend axially upward from a top face. An engagement member 57 is positioned along the feed shaft 40 above the differential feed gear 42. The engagement member 57 includes one or more apertures 58 that align with the one or more pins 56. When the differential feed gear 42 moves axially caused by the sliding of the cam faces 87, the pins 56 are inserted into the apertures 58 thus preventing additional rotation. This configuration may also be reversed with the differential feed gear 42 including apertures that receive pins that extend from the engagement member 57.

In another embodiment, the holding mechanism includes a flat disc type clutch.

In use, the differential feed gear 42 remains engaged with the spindle feed gear 32 through the gear teeth. As the cam faces 87 slide across one another due to the increased torque requirements, the differential feed gear 42 moves axially away from the differential drive gear 41. In one or more embodiments, the differential feed gear 42 slides axially relative to the spindle feed gear 32 due to one or more of the spindle feed gear 32 moving axially along the spindle 32 and the differential feed gear 42 moving axially away from the differential drive gear 41. Continued rotation of the differential drive gear 41 causes further sliding along the cam faces 87 thus forcing the gears 41, 42 farther apart until the gears 41, 42 eventually disengage. Once disengaged, the differential feed gear 42 contacts the holding mechanism to prevent further rotation. This in turn prevents rotation of the spindle feed gear 32. Although the gears 32, 42 may move relative to one another, the gears 32, 42 remain engaged through their gear teeth.

In another embodiment, or in combination with the clutch 70, the spindle feed gear 32 includes a lift ring 50. As illustrated in FIG. 9, the ring 50 extends under the differential feed gear 42 and in an advance feed operation is just below the bottom face of the differential feed gear 42. At the end of stroke or thrust overload condition the spindle feed gear 32 moves backward along the spindle 30 as described above. As the spindle feed gear 32 moves axially along the spindle 30, the lift ring 50 acts on the differential feed gear 42 and initiates the movement of it towards the second position used for retracting the tool (i.e., away from the differential drive gear 31). The lift ring 50 may axially move the differential feed gear 42 an axial distance to disengage from the differential drive gear 41. In one or more embodiments, the lift ring 50 may also move the differential feed gear 42 a distance to engage with the holding mechanism to prevent rotation.

In one or more embodiments, the lift ring 50 may be attached to the spindle feed gear 32. The lift ring 50 and feed gear 32 may be formed as an integral part, such as being molded together as a single, unitary construction. The lift ring 50 may also be attached to the underside of the feed gear 32 through one or more mechanical fasteners and/or adhesives. The lift ring 50 may also be a separate element that is held in contact against the underside of the feed gear 32 by a biasing member 38 (see FIGS. 5, 6). In another embodiment, the lift ring 50 is also connected to the spindle 30 with the feed gear 32 attached to the lift ring 50 through one or more mechanical fasteners and/or mounting methods.

Figure 11A:
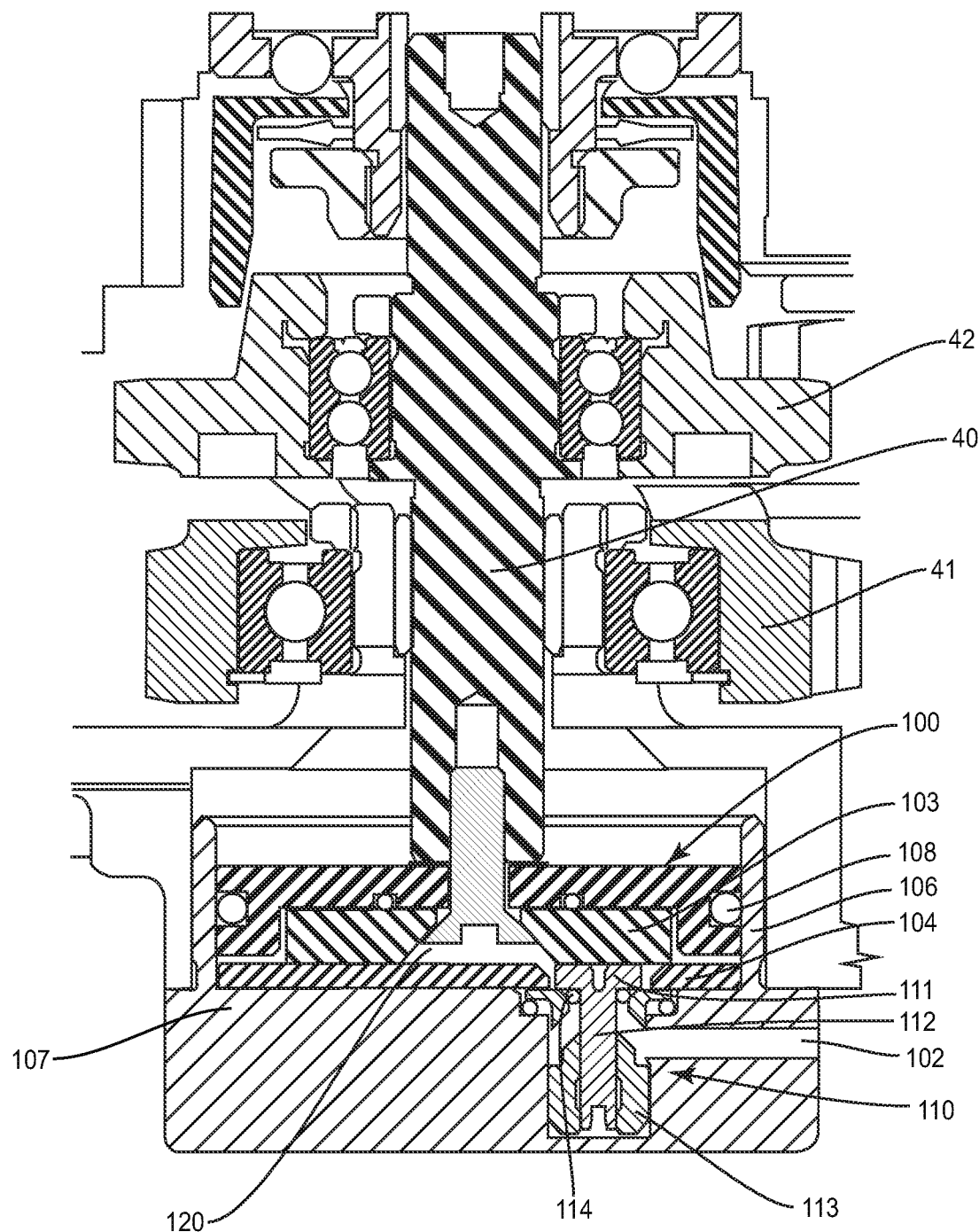
FIG. 11A is a side sectional view of a piston in a first position in a chamber with the tool in a forward feed operation.
Figure 11B:
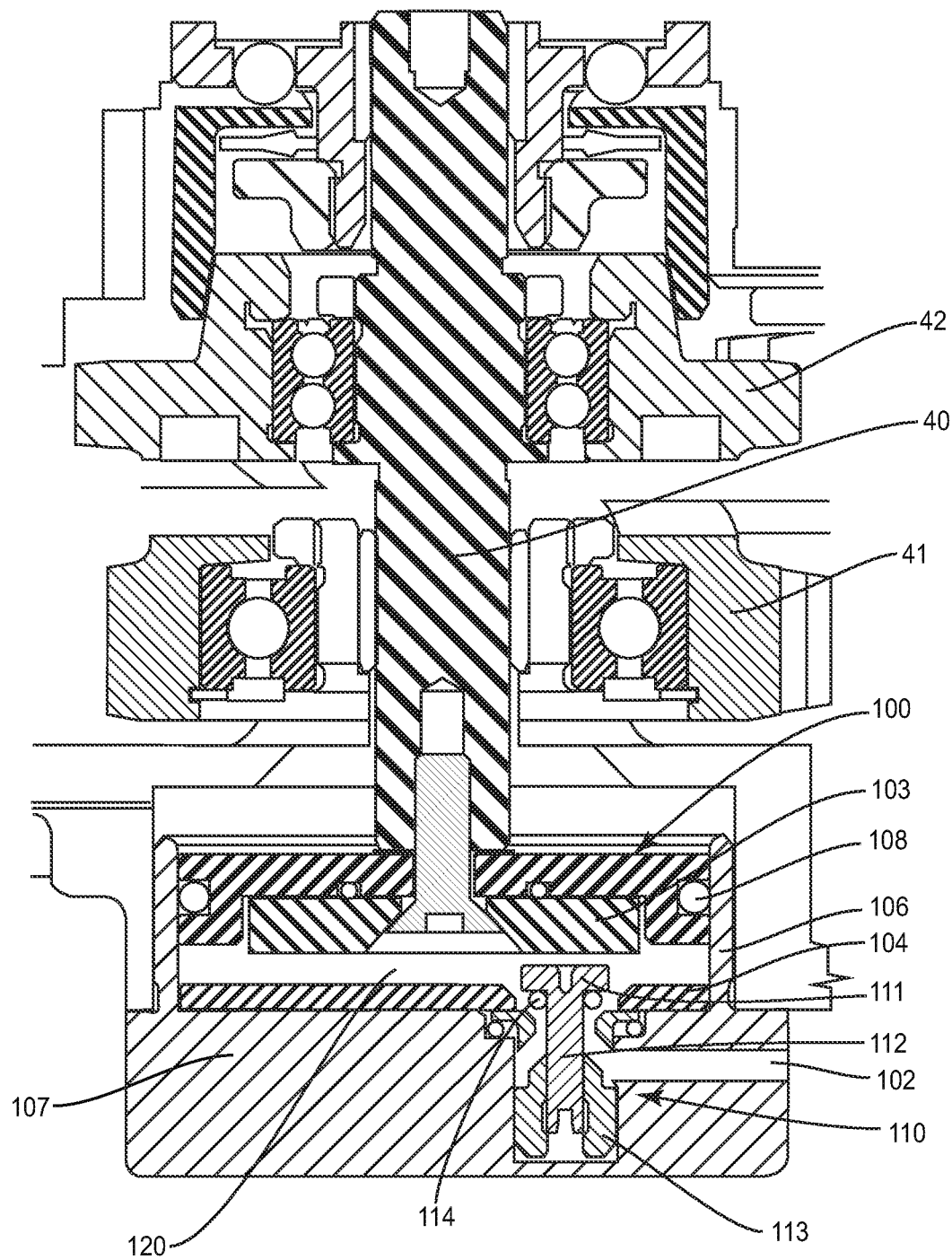
FIG. 11B is a side sectional view of a piston in a second position in the chamber with the tool in a retract operation.

The torque clutch 70 and/or lift ring 50 axially move the differential feed gear 42 a limited amount relative to the differential drive gear 41 and relative to the chamber 120. The piston 100 may be further configured to provide additional axial movement of the differential feed gear 42. The piston 100, feed shaft 40, and differential feed gear 42 are connected together to axially move as a unit. As illustrated in FIGS. 11A and 11B, the piston 100 is positioned in the chamber 120. The chamber 120 is stationary relative to the piston 100 and includes the outer side walls 106 and a bottom wall 107. The cross-sectional shape of the chamber 120 matches the piston 100 such that the piston 100 extends across the chamber 120 and the piston 100 is able to move axially within the chamber 120. In one embodiment, each of the piston 100 and chamber 120 include circular cross-sectional shapes. A seal 108 may extend around the periphery of the piston 100 to contact against the outer wall 106 of the chamber 120. The seal 108 is constructed from a flexible material to prevent or reduce air from moving past the piston 100. In one embodiment, the seal 108 is a rubber O-ring that extends around the periphery. The piston 100 also includes a magnet 103 that faces towards the bottom wall 107 of the chamber 120.

The chamber 120 includes an inlet 102 that extends through the bottom wall 107. The inlet 102 provides a conduit for moving air to and from the chamber 120. In one embodiment, the chamber 120 includes a single inlet with other embodiments featuring two or more inlets. The chamber 120 also includes a plate 104 that is secured at the bottom wall 107 and is magnetically attracted to the magnet 103. In one embodiment, the plate 104 is constructed from steel, although the plate 104 may also be constructed from various other materials that are magnetically attracted to the magnet 103. FIGS. 11A and 11B include the magnet 103 attached to the piston 100 and the plate 104 at the bottom wall 107 of the chamber 120. These elements may also be switched with the plate 104 forming a part of the piston 100 and the magnet 103 mounted at the bottom wall 107. In the various embodiments, the plate 104 and/or the magnet 103 may each extend completely across the chamber 120 and/or piston 100, or may extend across limited sections.

A poppet valve 110 is positioned at the inlet 102 to control a flow of air into the chamber 120. The poppet valve 110 includes a head 111 having an enlarged shape that extends over the inlet 102 where it enters the chamber 120. A rod 112 extends from the head 111 and seats in a housing 113 in the inlet 102. A seal 114 may be positioned at the inlet 102 to be contacted by the head 111 in the closed orientation to prevent air flow into the chamber 120.

The poppet valve 110 is positionable between closed and open orientations. In the closed orientation as illustrated in FIG. 11A, the head 111 is seated against the seal 114 to prevent and/or reduce air from entering into the chamber 120 from the inlet 102. In the open orientation as illustrated in FIG. 11B, the stem 112, head 111, and seal 114 have moved upward relative to the housing 113 such that the head 111 is within the chamber 120 and is spaced away from the housing 113 and plate 104. This allows air to move from the inlet 102 past the head 111 and into the chamber 120.

When the tool 10 is operating in the forward direction as illustrated in FIG. 11A, the piston 100 is positioned at the bottom wall 107 and extends over the inlet 102. The magnetic force between the magnet 103 and the plate 104 maintains the piston 100 in this position within the chamber 120. The magnet 103 may be in contact with the plate 104, or may be spaced away but in close enough proximity such that the magnetic force maintains the piston 100 downward in the chamber 120. In one embodiment, the residual force when the magnet 103 is in contact with the plate 104 is about 25 pounds. The poppet valve 110 is kept in the closed orientation by the magnet 103 contacting against the top of the head 111.

Once the movement of the differential feed gear 42 is initiated through the lift ring 50 and/or threshold clutch 70, the piston 100 moves axially in the chamber 120 away from the bottom wall 107 as it is coupled to the differential feed gear 42 through the differential feed shaft 40. As the piston 120 moves in the chamber 120, the poppet valve 110 also moves to the open orientation. This movement is caused by the force of the air acting on the bottom of the head 111 and the movement of the piston 100 away from the bottom of the chamber 120. Thus, as the piston 100 moves in the chamber 120, the poppet valve 110 also moves. The amount of fluid pressure may vary, provided it is adequate to move the poppet valve 110 to the open position.

The poppet valve 110 moving from the closed to open position includes the head 111, stem 112, and seal 114 moving within the housing 113 in the inlet 102 such that the head 111 is positioned away from the bottom wall 107. Thus air is able to move through the inlet 102 and into the chamber 120 to provide a greater force on the piston 100. Also, the magnetic force between the magnet 103 and the plate 104 exponentially reduces as these elements move away from one another in the chamber 120 thus requiring less force to move the piston 100 upward in the chamber 120.

Movement of the piston 100 in the chamber 120 causes the differential feed gear 42 to engage with the holding mechanism (e.g., cone clutch, dog clutch). This engagement holds the differential feed gear 42 stationary. The time for the engagement of the gear 42 and the holding mechanism to stop the gear 42 from rotating is greatly dependent on the force at which the piston 100 can move up in the chamber 120 to engage the two cone surfaces. The use of the magnet 103 and plate 104 and use of the additional air entering into the chamber 120 through inlet 102 provides a more responsive design that is able to quickly move the device 10 into the retract operation.

The piston 100 also moves in the opposing direction in a similar manner. When the spindle retraction is complete, air is no longer moved through the inlet 102 and into the chamber 120. In some embodiments, the air in the chamber 120 may be suctioned through the inlet 102 or another inlet. As the air no longer applies a force to the piston 100, the magnetic force between the magnet 103 and plate 104 causes the piston 100 to move downward in the chamber 120. Thus, the piston 100 is reset for forward movement of the spindle 30.

Figure 12:
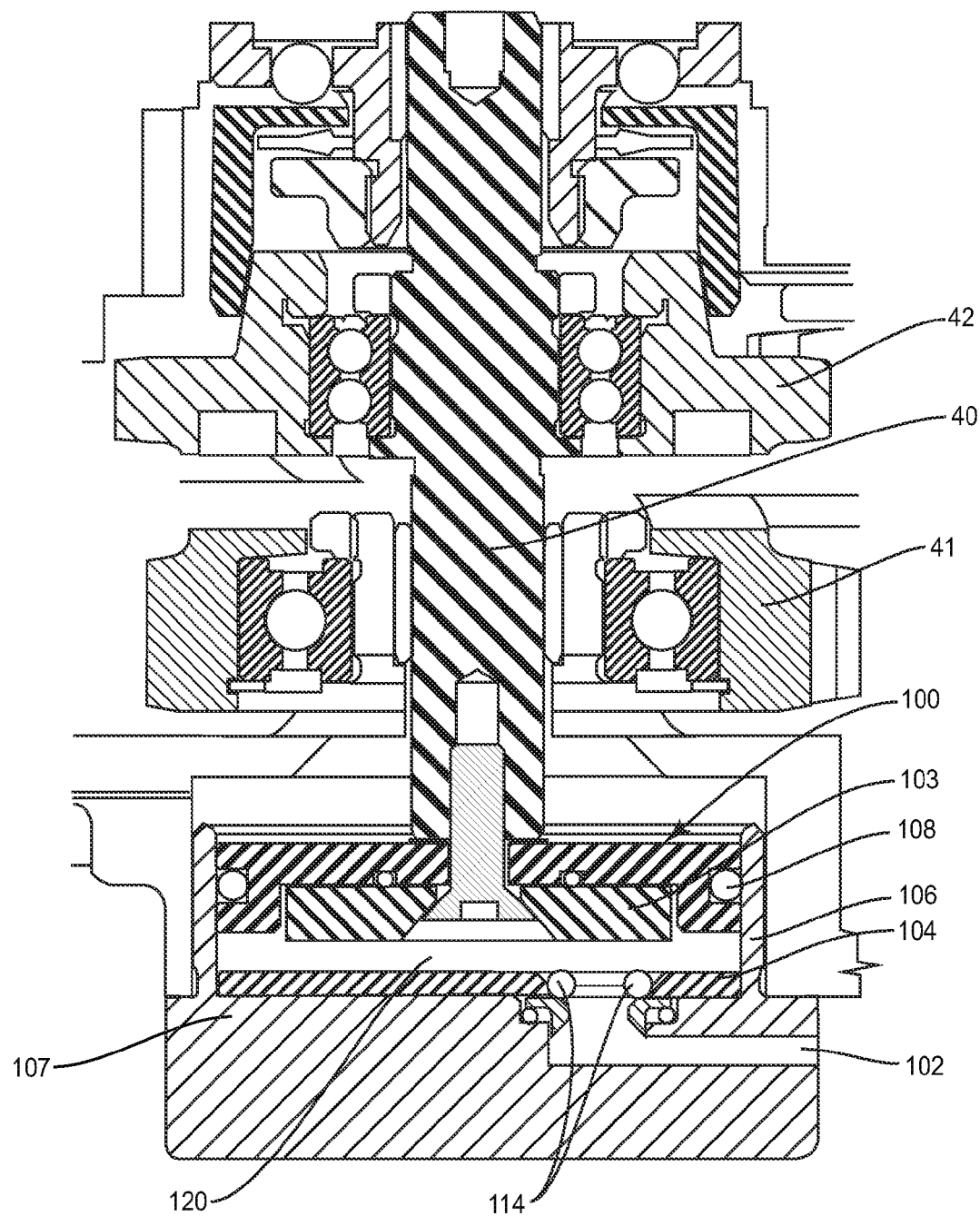
FIG. 12 is a side schematic side view of a tool with a magnet and plate combination with the piston in a second position in the chamber with the tool in a retract operation.

As described above, the tool 10 may include both a poppet valve 110 and a magnet 103/plate 104 combination. In another embodiment as illustrated in FIG. 12, the tool 10 just includes the magnet 103/plate 104 combination (i.e., no poppet valve). In a first orientation, the piston 100 is downward in the chamber 120 and across the inlet 102. The piston 100 may be in contact with the bottom wall 107 and/or an O-ring 114 at the inlet 102. When closed, the air in the inlet 102 is able to contact a limited surface area on the piston 100 (i.e., the portion of the piston 100 directly over the inlet 102). The force of the air acting on the piston 100 is less than the magnetic force formed between the magnet 103 and plate 104 thus maintaining the piston 100 in the closed orientation.

Movement to the open orientation begins when the piston 100 is moved away from the inlet 102 by one or both of the lift ring 50 and threshold clutch 70. This movement opens the inlet 102 and allows air to enter into the chamber 120. Also, more surface area of the piston 120 can be contacted by the air entering into the chamber 120 through the inlet 102. This additional force applied to the piston 100 in combination with the exponentially decreasing magnetic force between the magnet 103 and plate 104 provides for the air to move the piston 120 upward into the chamber 120 to the open orientation to engage the clutch formed between the gear 42 and cone 55. The pressure of the air in the chamber 120 maintains the piston 100 upward in the chamber 120 to keep the clutch engaged. When the retraction is complete, air may be removed from the chamber 120 through the inlet 102. This causes the piston 100 to move downward in the chamber 120 due to the magnetic force between the magnet 103 and plate 104. As in the other embodiments, the magnet 103 may be attached to the piston 100 and the plate 104 at the bottom of the chamber 120, or the inverse with the magnet 103 at the bottom of the chamber 120 and the plate 104 attached to the piston 100.

Figure 13:
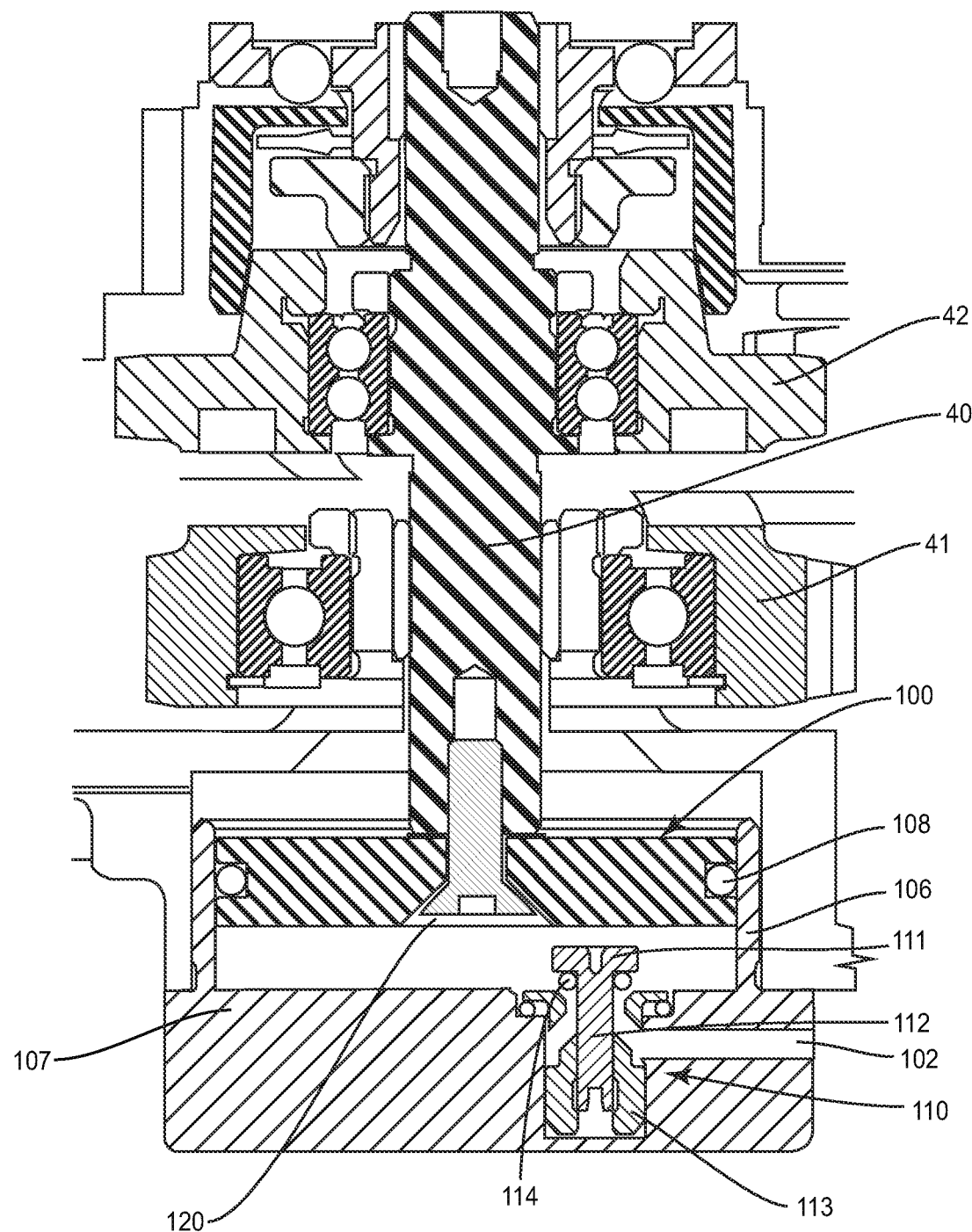
FIG. 13 is a side schematic side view of a tool with a poppet valve with the piston in a second position in the chamber with the tool in a retract operation.

FIG. 13 illustrates another embodiment in which the tool 10 includes just a poppet valve 110 (i.e., there is no magnet 103/plate 104 combination). The poppet valve 110 is positioned in the inlet 102 as in the previous embodiment. A seal 114 may be positioned along the inlet 102 to contact against the head 111 of the poppet valve 110 when it is in the closed position. The piston 100 is movable in the chamber 120 as stated above. In a downward orientation, the piston 100 contacts against the head 111 to close the poppet valve 110. In this closed orientation, the head 111 may contact against the seal 114 to prevent air from entering the chamber 120 through the inlet 102.

Movement to the open orientation begins when the piston 100 is moved away from the inlet 102 by one or both of the lift ring 50 and threshold clutch 70. This movement causes the air acting on the bottom of the head 111 of the poppet valve 110 to move the head 111 away from the inlet 102 thus allowing air to enter into the chamber 120. The air entering into the chamber 120 further applies a force to the piston 100 to move the piston upward in the chamber 120 to the open orientation to engage the clutch. The pressure of the air in the chamber 120 maintains the piston 100 upward in the chamber 120 to keep the clutch engaged. When the retraction is complete, air may be removed from the chamber 120 through the inlet 102 causing the piston 100 to move downward in the chamber 120 to contact the head 111 and move the poppet valve 110 back to the closed position. Further, a biasing mechanism may be engaged to further force the piston 100 downward in the chamber 120.

In one or more embodiments, the tool 10 includes a lift ring 50, a clutch 70, and a two-stage piston 100. The tool 10 may also include various other combinations. In one or more embodiments, the tool 10 includes a lift ring 50 and a two-stage piston 100 (without a clutch 70). In one or more embodiments, the tool 10 includes a threshold clutch 70 and a two-stage piston 100 (without a lift ring 50).

The differential drive gear 41 may be engaged with the differential feed gear 42 in a variety of different configurations. One embodiment includes the clutch mechanism 70 described above. Other embodiments include but are not limited to pin and hole drive, and a 90 degree face drive (dog drive).

The motor 12 may be pneumatic powered or electric powered. The motor 12 is configured to provide a rotational force to the differential drive gear 41 to rotate the other elements including the spindle 30 as described above. In one or more embodiments that use an electric motor 12, a separate air source controlled through an air logic system provides for movement of the two-stage piston 100.

In the various embodiments, one of the magnet 103 or the plate 104 is positioned at the bottom of the chamber 120. In some embodiments, the magnet 103 or the plate 104 is positioned on the bottom of the chamber 120. In other embodiments, the magnet 103 of plate 104 forms the bottom of the chamber 120.

Various types of fluids may be used to drive the piston 100 in the chamber 120. In one embodiment, air is used to drive the piston 100. Other embodiments may include various fluids, such as hydraulic fluids, water, and oil.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A positive feed tool configured to operate in a first mode and a second mode, the feed tool comprising:
    an elongated spindle adapted to carry a tool bit and to rotate and to move axially along a feed path, the spindle configured to operate in a first mode to move axially along the feed path in a first direction and a second mode to move axially along the feed path in an opposing second direction;
    first and second gears each operatively connected to the spindle;
    a differential drive comprising an elongated shaft spaced laterally away from the spindle, a piston positioned on the shaft, and third and fourth gears positioned on the shaft;
    a drive train that is engaged with the third gear to drive the differential drive;
    the third gear and the first gear being engaged to rotate the spindle, and the fourth gear and the second gear being engaged to axially move the spindle;
    a chamber positioned at the differential drive and comprising sidewalls, a closed end, and an opposing open end, the chamber positioned with the shaft extending into the open end and the piston positioned within the chamber;
    an inlet that extends through the closed end of the chamber;
    a magnet positioned on one of the piston and the closed end and a plate is positioned on the other of the piston and the closed end, the magnet and plate being magnetically attracted together to magnetically bias the piston towards the closed end of the chamber;
    a poppet valve comprising a head and a stem and being positioned at the inlet to control fluid flowing through the inlet and into the chamber;
    the differential drive being movable relative to the chamber between first and second positions to selectively move the spindle between the first and second modes, the first position comprising the piston in closer proximity to the closed end with the piston in contact with the head to position the head across the inlet, and the second position comprising the piston positioned a greater distance from the closed end with the head of the poppet valve spaced away from the inlet to allow fluid into the chamber.

2. The positive feed tool of claim 1, wherein the piston is positioned at an end of the shaft and the chamber is positioned at an end of the shaft.

3. The positive feed tool of claim 1, wherein the magnet is mounted on the closed end of the chamber and comprises an opening that aligns with the inlet.

4. The positive feed tool of claim 1, wherein one of the magnet and the plate form the closed end of the chamber.

5. The positive feed tool of claim 1, further comprising a seal that extends around the inlet with the head of the poppet valve positioned against the seal when the differential drive is in the first position.

6. The positive feed tool of claim 1, further comprising a first clutch mounted to the differential drive and second clutch positioned at the differential drive, the first and second clutches comprising mating conical surfaces that engage together to prevent rotation of the fourth gear when the differential drive is in the second position.

7. The positive feed tool of claim 1, wherein the piston is movable relative to the chamber with the piston being spaced away from the head of the poppet valve when the differential drive is in the second position.

8. The positive feed tool of claim 1, wherein the magnet is mounted on the piston and the plate is positioned on the closed end of the chamber.

9. The positive feed tool of claim 1, further comprising one or more ramps that extend axially outward from each of the third and fourth gears, the ramps each including cam surfaces that contact together to drive the spindle in the first mode.

10. The positive feed tool of claim 1, wherein the shaft extends through an opening in the third gear with the shaft and opening sized to allow the shaft to move independently of the third gear.

11. The positive feed tool of claim 10, wherein the shaft is fixedly attached to the fourth gear.

12. The positive feed tool of claim 1, further comprising a lift ring that axially extends from the second gear to contact against the fourth gear.

13. A method of initiating a shift of a spindle between first and second directions along a feed path in a positive feed tool with the positive feed tool comprising a power source, gearing, a differential unit that includes a shaft with third and fourth gears and a piston at one end, and a spindle unit with first and second gears each connected to the spindle, and a chamber positioned at an end of the differential unit, the method comprising:
    rotating the third gear;
    rotating the first gear that is driven by the third gear while rotating the second gear that is driven by the third gear through the fourth gear and driving the spindle in the first direction along the feed path;
    magnetically attracting the piston towards a closed end of the chamber and contacting the piston against a poppet valve and closing the poppet valve and preventing fluid from entering into the chamber through the inlet;
    applying a force to the differential unit and moving the shaft, the fourth gear, and the piston away from the closed end of the chamber, the shaft, the fourth gear, and the piston being connected together;
    opening the poppet valve as the piston moves away from the closed end causing fluid to enter into the chamber through the inlet;
    moving the piston, the shaft, and the fourth gear farther away from the closed end of the chamber by the fluid entering into the chamber through the inlet; and
    disengaging the fourth gear from the third gear through the movement and driving the spindle in the second direction along the feed path.

14. The method of claim 13, wherein rotating the third gear comprises rotating the third gear through the power source and gearing.

15. The method of claim 13, wherein magnetically attracting the piston towards a closed end of the chamber includes attracting a magnet on the piston towards a plate in the chamber.

16. The method of claim 13, wherein magnetically attracting the piston towards a closed end of the chamber comprises attracting a plate on the piston towards a magnet in the chamber.

17. The method of claim 13, wherein magnetically attracting the piston towards a closed end of the chamber comprises contacting a magnet on one of the piston and the chamber against a plate on the other of the piston and the chamber.

18. The method of claim 13, further comprising contacting a head of the poppet valve against the piston after fluid enters into the chamber through the inlet.

19. The method of claim 13, further comprising spacing the piston away from a head of the poppet valve when disengaging the fourth gear from the third gear.

20. The method of claim 13, further comprising increasing a fluid pressure within the chamber and moving the piston away from the closed end.

21. The method of claim 13, wherein applying the force to the differential unit comprises contacting a lift ring against the fourth gear.

22. The method of claim 13, wherein applying the force to the differential unit comprises sliding cam members on the third gear along cam members on the fourth gear and forcing the gears apart along the shaft.

23. The method of claim 13, further comprising sliding the shaft through an opening in the third gear and moving the shaft relative to the third gear while moving the piston, the shaft, and the fourth gear farther away from the closed end of the chamber.

24. The method of claim 13, further comprising moving air through the inlet and into the chamber and creating a pressure in the chamber that overcomes the magnetic force between a magnet and a plate.

* * * * *